O. D. Hunter,
Bolt.
N°. 67,549.     Patented Aug. 6, 1867.
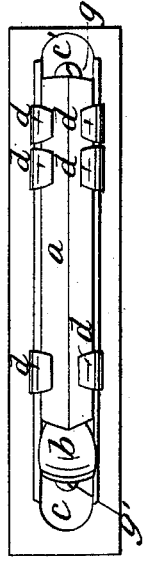
Fig. 1
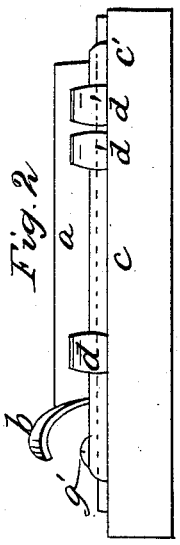
Fig. 2
Fig. 3
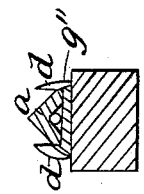
Witnesses:
R. D. H. Allen
A. M. Johnson
Inventor:
O. D. Hunter

United States Patent Office.

ORANGE D. HUNTER, OF TERRYSVILLE, CONNECTICUT.

Letters Patent No. 67,549, dated August 6, 1867.

---

IMPROVEMENT IN BOLTS.

---

*The Schedule referred to in these Letters Patent and making part of the same.*

---

TO ALL WHOM IT MAY CONCERN:

Be it known that I, ORANGE D. HUNTER, of Terrysville, county of Litchfield, and State of Connecticut, have invented certain new and useful Improvement in Bolts; and to enable others skilled in the art to make and use the same, I will proceed to describe it by referring to the drawings, in which the same letters indicate like parts in each of the figures.

This invention consists of a fastening-plate having clasps formed on its edges, also having holes formed therein, through which screws are turned to secure said plate in its proper place for use; it further consists of the employment of a screw having a projecting head for securing the back end of said plate, the office of which is to hold the plate in its proper place, and also to prevent the bolt from being withdrawn from the plate; it further consists of providing a spring or elastic ball arranged within the cavity of the bolt, or between the bolt and the plate, the office of which is to retain said bolt in a fixed position. In the accompanying drawings—

Figure 1 is a top view of this improvement.

Figure 2 is an edge view of the same.

Figure 3 is an under side view of the bolt.

Figure 4 is a cross-section view of cut through the clasps.

$a$ is the bolt proper. These bolts may be made circular or V-shaped, as may be desirable, or as fancy may dictate. $b$ is a projection or thumb-piece, by means of which the bolt is moved back and forth. $c$ is a plate in or upon which the bolt $a$ is arranged. $a$ are clasps, which are shown in figs. 1 and 2, arranged in proper position for holding the sliding bolt, the shape and position of which, as produced, and before being bent or set up against the bolt, is clearly shown in fig. 4. $c'$ is a catch-plate, the clasps of which are produced or formed in the same way as those of the bolt-plate. The bolt $a$ (the shape of which is clearly shown in figs. 1, 2, and 3,) is made depressed on its under side, corresponding with its outer shape or surface. A stop, $e$, is provided in the under side of the bolt, which, in connection with the projecting screw-head, governs the extent of the sliding motion of the bolt $a$. $g$ are fastening-screws, one or more of which pass through the bolt-plate near its front end, and directly under the hollow of the bolt $a$. $g'$ is a screw having a projecting head. This screw serves the double purpose of fastening the bolt-plate and to prevent the bolt from being withdrawn from the clasps of the plate, which is inserted to its place before the screw is inserted into the back end of the plate. $g''$ is a spring or elastic ball placed within the hollow of the bolt, or between the bolt and the plate, the office of which is to retain said bolt in a fixed position. Now, after the bolt and plate have been properly finished, the bolt $a$, or a former made for that purpose, is placed upon the plate $c$ between the clasps $d$, the inside of which stand in about a right-angle position with the plate $c$, and the clasps are bent or set closely up against the bolt or former, thus firmly securing the bolt on the plate $c$, so as to move closely and freely between the clasps $d$. The catch-plate is also made in the same way. After all the parts are completed and in readiness for use, the plate $c$ is secured in its desired place by one or more screws through the plate directly under the seat of the bolt near the front end; then the spring or elastic ball, with the bolt, is inserted to its place on the plate $c$ between the clasps, and slid forward so as to allow the projecting head-screw $g'$ to be inserted into the back end of the plate, thus securing the plate, and also preventing the bolt from being withdrawn therefrom. In this way I am enabled to produce a new improved article of manufacture, cheap, and simple of construction, and desirable as an article of trade and use.

I believe I have thus shown the nature, construction, and advantage of this improvement, so as to enable others skilled to make and use the same.

What I claim, therefore, and desire to secure by Letters Patent, is, as a new improved article of manufacture—

The bolt $a$, plate $c$, clasps $d$, constructed, arranged, and operating substantially as and for the purpose described.

O. D. HUNTER. [L. S.]

Witnesses:
R. D. H. ALLEN,
A. M. JOHNSON.